Dec. 1, 1970          G. J. HAGOPIAN          3,543,380
METHOD OF MAKING A GOLF BALL MOLD
Filed May 6, 1968

INVENTOR.
GARY J. HAGOPIAN
BY *Kenwood Ross and*
*Chester E. Flavin*
ATTORNEYS.

United States Patent Office 3,543,380
Patented Dec. 1, 1970

3,543,380
METHOD OF MAKING A GOLF BALL MOLD
Gary J. Hagopian, 17 Belli Drive,
Wilbraham, Mass. 01095
Filed May 6, 1968, Ser. No. 726,791
Int. Cl. B23p 9/00
U.S. Cl. 29—445                  5 Claims

ABSTRACT OF THE DISCLOSURE

A golf ball mold as formed by the sequential steps of: spinning, stamping or otherwise forming a semispherical cup from sheet stock, trimming the so-forming cup so as to allow an annular protrusion extending slightly above the cup center line, stamping a pattern of dimples into the cup, forming a machined steel holder provided with a semispherical recess or arcuate surface extending inwardly from one face thereof, assembling the so-dimpled cup into the recess of the so-formed holder, brazing or otherwise securing the dimpled cup in the recess of the holder with the annular protrusion extending outwardly of the holder, and machining the outside dimensions of the assembled dimpled cup and holder.

BACKGROUND OF THE INVENTION

This invention relates to the mold half employed in the making of a golf ball, which may consist of a lower section, and together with a like mold half, which may consist of an upper section, with each section having a hemispherical depression or cup, when the two mold halves are in confronting relation, forms a spherical ball forming cavity or chamber, the chamber being provided with dimples or brambling pits for embossing the ball shell with dimples or brambles.

Operationally, the mold halves are normally clamped together with the ball core being suspended centrally of the mold chamber by means of needles or a like system with the shell material being supplied therearound in a fluent condition by any suitable means.

This invention is especially directed to the structure of the golf ball mold cavity per se and to the method of making same.

Heretofore considerable difficulty, not to mention expense, has been experienced in the cutting of molds for use in the manufacture of golf balls.

As has been and is practice in the golf ball industry, a wide variety of geometric designs in golf ball covers is a desideratum such designs being produced in the golf ball molding operation.

Tremendous pressures are employed in golf ball manufacture, wherefore the use of molds formed of tool or equivalent hard steels has been dictated. Such molds heretofore have been cut or engraved in order to provide the desired design. Exceptional accuracy has been mandatory so as to be reflected in excessive mold costs, particularly in the cases of more intricate designs As a matter of fact, production costs have been so out of line that molds have often been formed from softer metals leading only to agonizing results with respect to mold distortions, not to mention out of shape balls and/or imperfect designs thereon.

According to the letter and spirit of this invention, golf ball molds are taught which can be readily produced by the most average of machinists, the heretofore required skill for forming such molds being obviated.

DESCRIPTION OF THE PREFERRED EMBODIMENTS

Figure 1:
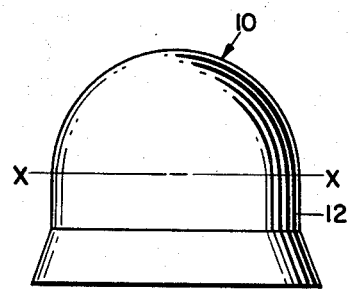
FIG. 1 is an inverted side elevational view of the hemispherical cup of the invention.
Figure 2:
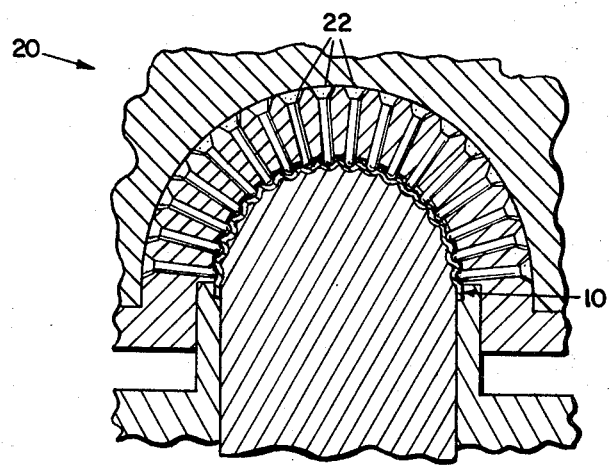
FIG. 2 is a fragmentary view of the cup of FIG. 1 within a dimple die for the formation therein of the dimples.

With reference now to the drawings, in FIG. 1 is shown a semispherical cup 10 which preferably but not necessarily is formed as by stamping, spinning or otherwise from a sheet metal stock of a thickness preferably $\frac{1}{32}''$ so as to define a half of a sphere with an excess 12 being formed beyond what will be referred to as the center or trim line X—X.

As to the second step of the method, the so-formed cup 10 is trimmed either on the center or trim line X—X or along a parallel line up to .050" therebeyond, preferentially the latter.

The so-formed and so-trimmed semispherical cup 10 is next placed in a dimpling die generally indicated by 20 whereat a plurality of dimpling fingers 22 are caused to be driven inwardly simultaneously so as to form dimples 24 in the entirety of the outer wall of the cup according to the predetermined pattern desired on the inner wall of the cup, and normally in an overall design of equi-spaced dimples.

A holder 30, preferably but not necessarily fabricated from steel, which may be circular in outer lateral contour is machined with a semispherically-shaped concave recess 32 extending inwardly from one face thereof, the recess dimensions being such as to snugly accommodate the complemental semispherical cup 10 upon the assembly of the pair of components.

Figure 3:
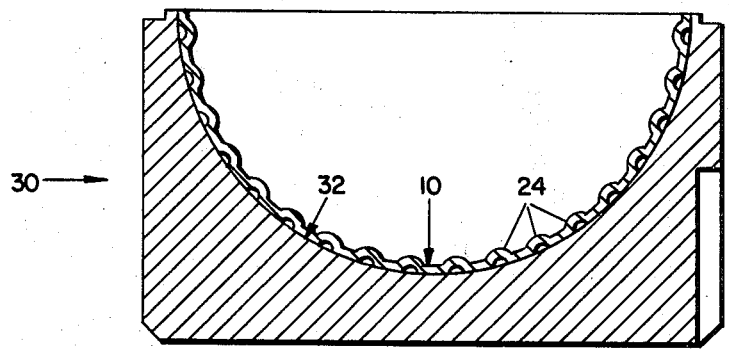
FIG. 3 is a sectional view through an assembled dimpled cup and holder.

The so-formed cup 10 and so-formed holder 30 are assembled together, as shown in FIG. 3, with the cup being arranged concentrically with the concave recess of the holder, and with their adjacent annular edges being aligned, and the assemblage is mounted upon a holding fixture of conventional construction (not shown) for the brazing or otherwise securing of cup to holder.

The so-assembled cup and holder are then machined to the prescribed finish dimensions.

I claim:

1. A method of forming a golf ball mold comprising the steps of: forming a semispherical cup, trimming the so-formed cup, impressing a pattern of dimples into the cup, forming a holder provided with a semispherical recess extending inwardly from one face thereof, assembling the so-dimpled cup into the recess of the so-formed holder, and securing the dimpled cup in the recess of the holder.

2. A method of forming a golf ball mold according to claim 1, wherein the semispherical cup is formed from sheet stock.

3. A method of forming a golf ball mold according to claim 1, wherein the holder is machined steel.

4. A method of forming a golf ball mold according to claim 1, wherein the so-formed cup is trimmed so as to allow an annular protrusion extending slightly above the cup center line.

5. A method of forming a golf ball mold according to claim 4, wherein the annular protrusion extends outwardly of the holder and including the additional step of machining the outside dimensions of the assembled dimpled cup and holder.

References Cited

UNITED STATES PATENTS

| | | | |
|---|---|---|---|
| 1,034,580 | 8/1912 | Buckau | 18—42 |
| 1,294,486 | 2/1919 | Kuen | 29—445 |
| 1,822,451 | 9/1931 | Oestnaes | 249—112 |
| 2,257,468 | 9/1941 | Langel. | |
| 3,050,844 | 8/1962 | Wagner. | |
| 3,258,840 | 7/1966 | Hedgewick et al. | 29—475 XR |
| 3,287,767 | 11/1966 | Ford et al. | 18—36 XR |

CHARLIE T. MOON, Primary Examiner

U.S. Cl. X.R.

29—463, 471.3, 475; 18—42; 249—116